United States Patent
Vestergaard Kragelund et al.

(10) Patent No.: US 10,361,649 B2
(45) Date of Patent: Jul. 23, 2019

(54) PUMP ASSEMBLY AND CONTROLLING METHOD

(71) Applicant: GRUNDFOS HOLDING A/S, Bjerringbro (DK)

(72) Inventors: Klaus Vestergaard Kragelund, Risskov (DK); Jan Plougmann, Bjerringbro (DK); Jan Carøe Aarestrup, Bjerringbro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 0 days.

(21) Appl. No.: 15/938,302

(22) Filed: Mar. 28, 2018

(65) Prior Publication Data

US 2018/0287542 A1 Oct. 4, 2018

(30) Foreign Application Priority Data

Mar. 31, 2017 (EP) .................................... 17164400

(51) Int. Cl.
*F04B 17/03* (2006.01)
*H02P 27/04* (2016.01)
(Continued)

(52) U.S. Cl.
CPC ............ *H02P 27/047* (2013.01); *F04D 13/06* (2013.01); *F04D 13/0606* (2013.01);
(Continued)

(58) Field of Classification Search
None
See application file for complete search history.

(56) References Cited

U.S. PATENT DOCUMENTS 4,473,338 A * 9/1984 Garmong .............. E21B 43/128
307/141
5,092,302 A * 3/1992 Mohan ................ H02M 3/3378
123/497

(Continued)

FOREIGN PATENT DOCUMENTS

EP 2 133 991 A1 12/2009
EP 2133991 B1 6/2011
(Continued)

*Primary Examiner* — Bentsu Ro
(74) *Attorney, Agent, or Firm* — McGlew and Tuttle, P.C.

(57) ABSTRACT

A pump assembly (1) includes a pump unit (2), an electrical drive motor (203) for driving the pump unit (2), and a control unit (201) for controlling the drive motor (203). The control unit (201) includes a frequency converter (209), a voltage converter (207) and a controller (211). The voltage converter (207) is configured to provide an input voltage ($U_{in}$) to the frequency converter (209). The input voltage ($U_{in}$) is adjustable within a voltage range between a minimum input voltage ($U_{min}$) and a maximum input voltage ($U_{max}$). The controller (211) is configured to determine an actual power consumption of at least one of the drive motor (203), the frequency converter (209) and the voltage converter (207) during operation of the pump unit (2). The controller (211) is further configured to tune the input voltage ($U_{in}$) depending on the determined actual power consumption during operation of the pump unit (2).

19 Claims, 5 Drawing Sheets

(51) Int. Cl.
  *F04D 15/00*  (2006.01)
  *F04D 13/06*  (2006.01)
  *H02P 27/08*  (2006.01)
  *H02P 27/06*  (2006.01)

(52) U.S. Cl.
  CPC .......... *F04D 15/0066* (2013.01); *H02P 27/06* (2013.01); *H02P 27/08* (2013.01)

(56) References Cited

U.S. PATENT DOCUMENTS

| | | | | |
|---|---|---|---|---|
| 5,318,409 | A * | 6/1994 | London | F04B 49/065 417/18 |
| 6,045,333 | A * | 4/2000 | Breit | F04B 47/06 417/42 |
| 6,414,455 | B1 * | 7/2002 | Watson | F04B 47/02 318/432 |
| 2005/0068001 | A1 | 3/2005 | Skaug et al. | |
| 2014/0136000 | A1 | 5/2014 | Ahola et al. | |
| 2016/0352187 | A1 | 12/2016 | Wolf | |

FOREIGN PATENT DOCUMENTS

| | | |
|---|---|---|
| RU | 2157468 C1 | 10/2000 |
| RU | 2455750 C1 | 7/2012 |

* cited by examiner

PUMP ASSEMBLY AND CONTROLLING METHOD

CROSS REFERENCE TO RELATED APPLICATIONS

This application claims the benefit of priority under 35 U.S.C. § 119 of European Application 17164400, filed Mar. 31, 2017, the entire contents of which are incorporated herein by reference.

TECHNICAL FIELD

The present disclosure relates generally to pump assemblies, in particular to speed controlled wet rotor centrifugal pumps, and a method for controlling an electrical drive motor for driving such a pump. Such pumps in the power range of 5 W to 3 kW are typically used in circulation pumps of house heating systems.

BACKGROUND

It is a general goal of pump design to reduce the overall power consumption of a pump as much as possible. Speed controlled wet rotor pumps usually comprise a frequency converter configured to drive the motor at a desired speed according to the required pumping power. In order to drive the motor with a pulse width modulated signal having a sinusoidal shape, the switching frequency of the frequency converter must be high, which introduces switching losses in the frequency converter.

EP 2 133 991 describes a speed controlled pump in which the input voltage to the frequency converter is adapted by a voltage converter to the required output voltage aiming for a maximum modulation index for minimizing switching losses in the frequency converter.

SUMMARY

In contrast to such known pumps, embodiments of the present disclosure provide a pump assembly with further reduced power consumption.

In accordance with a first aspect of the present disclosure, a pump assembly is provided comprising a pump unit, an electrical drive motor for driving the pump unit, and a control unit for controlling the drive motor. The control unit comprises a frequency converter, a voltage converter and a controller, wherein the voltage converter is configured to provide an input voltage $U_{in}$ to the frequency converter, the input voltage being adjustable within a voltage range between a minimum input voltage $U_{min}$ and a maximum output voltage $U_{max}$. The controller is configured to determine an actual power consumption of at least one of the drive motor, the frequency converter and the voltage converter during operation of the pump unit, and configured to tune the input voltage depending on the determined actual power consumption during operation of the pump unit. The controller may be part of the frequency converter or of the voltage converter or a separate component of the control unit.

Optionally, the controller may be configured to determine an actual combined power consumption of the drive motor, the frequency converter and the voltage converter, and to tune the input voltage depending on the determined actual combined power consumption. Thereby, not only the switching losses in the frequency converter can be minimized, but in addition the conversion losses in the voltage converter and the power losses in the motor.

Optionally, the controller may thus be configured to tune the input voltage so that the actual power consumption is minimized. To achieve this, a minimum power loss (MPL) algorithm may be applied to find the optimal input voltage for achieving the lowest power consumption of the combined system comprising the drive motor, the frequency converter and the voltage converter. For instance, the MPL algorithm may increase the input voltage from $U_0$ to $U_1$ and compares the power consumption $P_0$ for $U_0$ and the power consumption $P_1$ for $U_1$. If the power consumption $P_1$ for $U_1$ is smaller than the power consumption $P_0$ for $U_0$, the input voltage may be further increased to $U_2$. If the power consumption $P_1$ for $U_1$ is higher than the power consumption $P_0$ for $U_0$, the input voltage may be decreased from $U_0$ to $U'_1$, and then further decreased to $U'_2$ if the power consumption has reduced by $\Delta P$ from $U_0$ to $U'_1$. This process may be iteratively repeated with constant $\Delta U = U_0 - U_1 = U_1 - U_2 = \ldots$ or preferably variable $\Delta U = f(\Delta P)$ to find the optimal input voltage with the least power consumption as quickly as possible.

Optionally, the controller may be configured to determine a rate of change in actual power consumption in at least one of the drive motor, the frequency converter and the voltage converter during operation of the pump, wherein the controller is configured to tune the input voltage only if the positive rate of change of the actual power consumption is below a defined threshold, or if a parameter relating to the positive rate of change of the actual power consumption is below a defined threshold for that parameter. For instance, the MPL algorithm may be switched off when the power consumption is rising too quickly and switched on when the power consumption is stable within the defined threshold.

Optionally, the controller may be configured to increase the input voltage in a pre-defined manner if the positive rate of change of the actual power consumption is above the threshold. For instance, the input voltage may be increased at a constant rate or steps as long as the positive rate of change of the actual power consumption is above the defined threshold. If the power consumption is rising too quickly, an input voltage achieving a maximum modulation index may be applied. The modulation index M shall be defined herein as the ratio between the effective AC output voltage $U_{out}$, i.e. the output phase voltage relative to a neutral potential, of the frequency converter and the maximum effective AC output voltage $U_{out,max}$, which is limited by the frequency converter input DC voltage $U_{in}$, i.e.

$$M = \frac{U_{out}}{U_{out,max}} = \frac{U_{out}}{\frac{U_{in}}{2\cdot\sqrt{2}}\cdot 1.15}.$$

Optionally, the controller may be configured to determine the actual electrical power consumption in pre-defined temporal intervals or in an essentially continuous manner to tune the input voltage accordingly.

Optionally, the controller may be configured to determine a power consumption differential $\Delta P$ between the power consumption when the input voltage is provided and the power consumption when another input voltage was previously provided, wherein tuning the input voltage includes changing the input voltage by a voltage differential $\Delta U$, wherein the sign and/or the amount of the voltage differential ΔU is dependent on the determined power consumption differential ΔP.

Optionally, the drive motor may be operable in a field-weakening mode and a non-field-weakening mode, wherein the controller is configured to tune the input voltage within a voltage range between a minimum input voltage $U_{min}$ and a reference voltage $U_{ref}$ in the field weakening mode, and wherein the controller is configured to tune the input voltage within a voltage range between the reference voltage $U_{ref}$ and a maximum input voltage $U_{max}$ in the non-field-weakening mode, wherein $U_{min} < U_{ref} < U_{max}$. The reference voltage $U_{ref}$ may be defined herein as the input voltage $U_{in}$ in non-field-weakening mode for which the modulation index M is maximal, i.e.

$$M_{max} = \frac{U_{out}}{\frac{U_{ref}}{2 \cdot \sqrt{2}} \cdot 1.15} \approx 1.$$

The effective AC output voltage $U_{out}$ of the frequency converter to the motor is limited by the input voltage $U_{in}$ from the voltage converter to the frequency converter resulting in a maximum effective AC output voltage $$U_{out,max} = \frac{U_{in}}{2 \cdot \sqrt{2}} \cdot 1.15.$$

Herein, the term "field-weakening mode" shall mean that the stator current partly reduces the total magnetic flux, because it is phase-shifted with respect to the rotor magnetic flux by more than 90°. The term "non-field-weakening mode" shall mean that a stator current has a phase-shift of 90° or less with respect to the rotor magnetic flux such that no component of the stator current reduces the total magnetic flux.

Optionally, the frequency converter and the voltage converter are located on separate circuit boards, preferably separated by a housing wall.

Optionally, the pump unit comprises a wet rotor circulation pump for a heating or cooling system.

In accordance with a second aspect of the present disclosure, a method for controlling an electrical drive motor for driving a pump unit is provided, wherein a control unit of the electrical drive motor comprises a frequency converter and a voltage converter. The method comprises the following steps:
providing an input voltage to the frequency converter by the voltage converter, wherein the input voltage is adjustable within a voltage range between $U_{min}$ and $U_{max}$,
determining an actual power consumption of at least one of the drive motor, the frequency converter and the voltage converter during operation of the pump unit, and
tuning the input voltage depending on the determined actual power consumption during operation of the pump unit.

Optionally, the step of tuning the input voltage includes tuning the input voltage so that the actual power consumption is minimized.

Optionally, the method may comprise a further step of determining a rate of change in actual power consumption in at least one of the drive motor, the frequency converter and the voltage converter during operation of the pump, and wherein tuning the input voltage includes the condition that the positive rate of change of the actual power consumption is below a defined threshold. Optionally, the step of tuning the input voltage includes increasing the input voltage in a pre-defined manner if said condition is not fulfilled.

Optionally, the step of determining the actual electrical power consumption includes determining the actual electrical power consumption in pre-defined temporal intervals or in an essentially continuous manner for tuning the input voltage accordingly.

Optionally, the step of tuning the input voltage includes tuning the input voltage within a voltage range between the minimum input voltage $U_{min}$ and a reference voltage $U_{ref}$ when the drive motor is operated in a field-weakening mode, and wherein tuning the input voltage includes tuning the input voltage within a voltage range between the reference voltage $U_{ref}$ and the maximum input voltage $U_{max}$ when the drive motor is operated in a non-field-weakening mode, wherein $U_{min} < U_{ref} < U_{max}$.

Optionally, the method may comprise a step of feeding back the reference voltage $U_{ref}$ from the frequency converter to the voltage converter. In case of high fluctuations of the power consumption, the voltage converter may then tune the input voltage to the reference voltage in non-field-weakening mode.

Optionally, the method may comprise a step of signaling the determined actual total power consumption to the frequency converter. The actual total power consumption may be the actual power consumption of the combined system of frequency converter, motor and voltage converter.

Optionally, the step of determining the actual total power consumption includes determining an approximate power consumption in the voltage converter based on a look-up table and/or a determined actual power consumption in the frequency converter and/or the input voltage.

Optionally, the method may comprise a step of determining a power consumption differential ΔP between the power consumption when the input voltage is provided and the power consumption when another input voltage was previously provided, wherein tuning the input voltage includes changing the input voltage by a voltage differential ΔU, wherein the sign and/or the amount of the voltage differential ΔU is dependent on the determined power consumption differential ΔP.

BRIEF DESCRIPTION OF THE DRAWINGS

Embodiments of the present disclosure will now be described by way of example with reference to the following figures of which.

DETAILED DESCRIPTION

Figure 1:
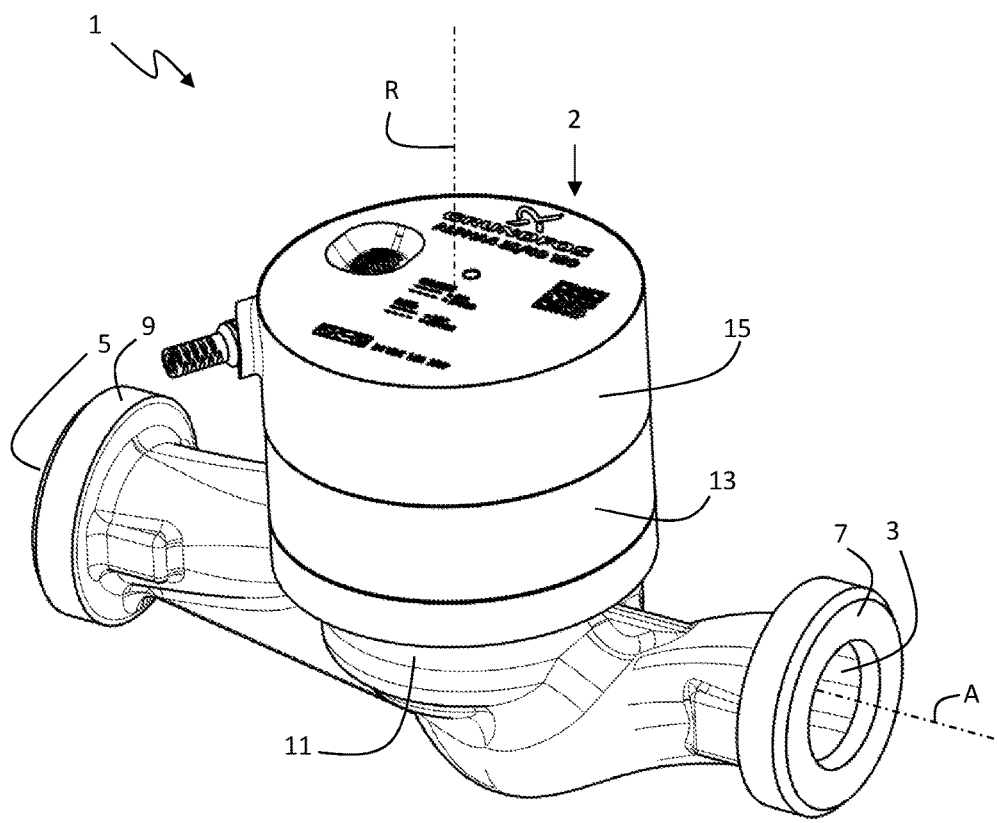
FIG. 1 is a perspective view of an example of a pump assembly according to this disclosure.

FIG. 1 shows a pump assembly 1 with a centrifugal pump unit 2, an input port 3 and an output port 5, wherein the input port 3 and an output port 5 are coaxially arranged on a pipe axis A on opposing sides of the pump unit 2. The input port 3 and the output port 5 comprise connector flanges 7, 9 for a connection to pipes (not shown). The pump unit 2 comprises a rotor axis R essentially perpendicular to the pipe axis A. A pump housing 11 of the pump unit 2 is essentially arranged between the input port 3 and the output port 5. The pump housing 11 comprises an impeller (not shown) for rotating around the rotor axis R and pumping fluid from the input port 3 to the output port 5. The impeller is driven by a motor (not shown) located in a motor housing 13 extending from the pump housing 11 along the rotor axis R to an electronics housing 15. The electronics housing 15 comprises a control unit 201 (see FIG. 2) for controlling a three-phase synchronous permanent magnet drive motor 203.

Figure 2:
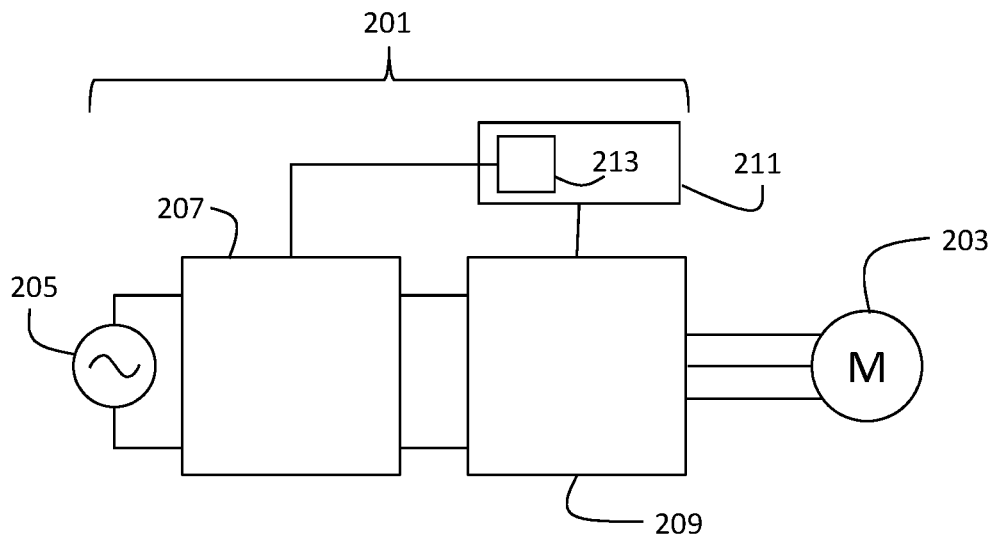
FIG. 2 is a schematic view of a control circuitry of a first example of a pump assembly according to this disclosure.

The control circuitry shown in FIG. 2 comprises the control unit 201 for controlling the three-phase synchronous permanent magnet drive motor 203. The control unit 201 receives an AC supply voltage 205. This AC supply voltage 205 may be a 230V/110V line voltage or it may be a low AC supply voltage, e.g. 60V, provided by an internal or an external power supply unit (not shown). The control unit 201 comprises a voltage converter 207 and a frequency converter 209, wherein the voltage converter 207 receives the AC supply voltage 203 and provides a DC input voltage $U_{in}$ to the frequency converter 209. The frequency converter 209 provides to each of the three phases of the drive motor 203 a pulse-width modulated AC output voltage $U_{out}$ for driving the motor 203. The three phases are phase-shifted by 120° with respect to each other.

The control unit 201 further comprises a controller 211 controlling switches within the frequency converter 209. The controller 211 may be part of the frequency converter 209 or an extra circuitry. The controller 211 comprises a minimum power loss module 213 incorporating a minimum power loss (MPL) algorithm. The controller 201 is configured to determine an actual power consumption of at least one of the drive motor 203, the frequency converter 209 and the voltage converter 207, preferably an actual total power consumption of a combined system of motor 203, frequency converter 209 and voltage converter 207, during operation of the pump unit 2. The input voltage $U_{in}$ provided by the voltage converter 207 is adjustable within a voltage range between $U_{min}$ and $U_{max}$, wherein the controller 211 is configured to tune the input voltage $U_{in}$ depending on the determined actual power consumption during operation of the pump unit 2.

Figure 3:
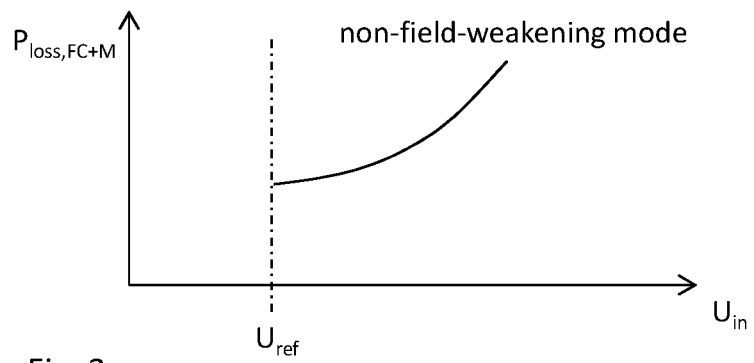
FIG. 3 is a graph view showing a power loss in the combined system of frequency converter and motor operating in non-field-weakening mode as a function of an input voltage to the frequency converter of an example of a pump assembly according to this disclosure.

As shown in FIG. 3, the power loss in the combined system of frequency converter 209 and motor 203 rises in non-field-weakening mode from a reference voltage $U_{ref}$ with the input voltage $U_{in}$. The reference voltage $U_{ref}$ may be the input voltage $U_{in}$ in non-field-weakening mode for which the modulation index $$M = \frac{U_{out}}{U_{out,max}} = \frac{U_{out}}{\frac{U_{in}}{2\cdot\sqrt{2}}\cdot 1.15}$$

is maximal, i.e.

$$M_{max} = \frac{U_{out}}{\frac{U_{ref}}{2\cdot\sqrt{2}}\cdot 1.15} \approx 1.$$

Figure 4:
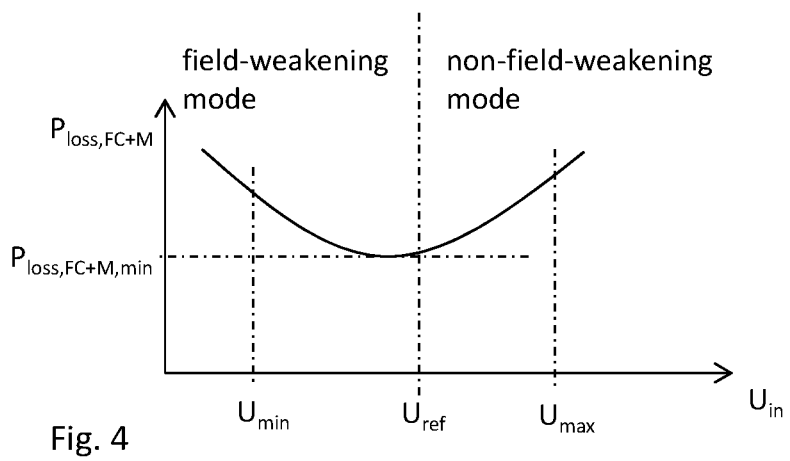
FIG. 4 is a graph view showing a power loss in the combined system of frequency converter and motor operating selectively in either field-weakening mode or non-field-weakening mode as a function of an input voltage to the frequency converter of an example of a pump assembly according to this disclosure.
Figure 7:
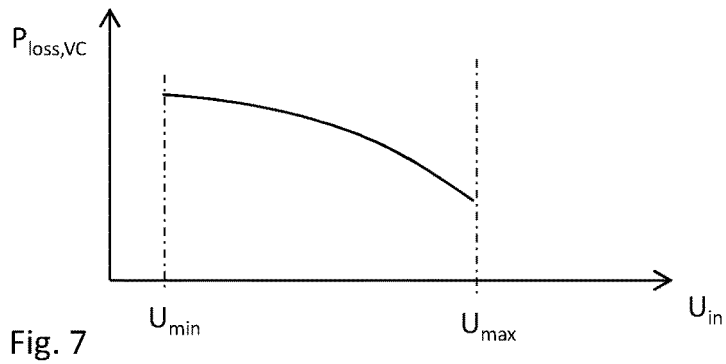
FIG. 7 is a graph view showing a power loss in a voltage converter as a function of an input voltage to the frequency converter of an example of a pump assembly according to this disclosure.
Figure 8:
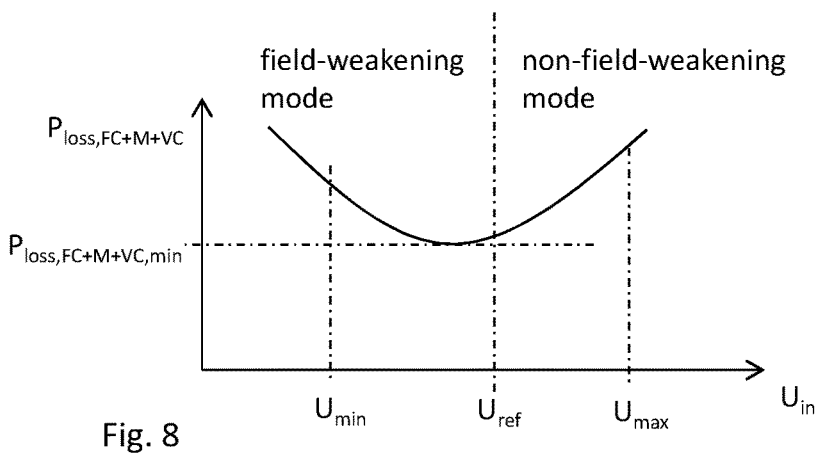
FIG. 8 is a graph view showing a power loss in the combined system of frequency converter, motor and voltage converter as a function of an input voltage to the frequency converter of an example of a pump assembly according to this disclosure.

Thus, for reducing the input voltage $U_{in}$ below the reference voltage $U_{ref}$ the motor 203 may be operated in field-weakening mode. When selectively operated in field-weakening mode or non-field-weakening mode, the combined system of frequency converter 209 and motor 203 shows a minimum power loss $P_{loss,FC+M,min}$ (see FIG. 4) at an input voltage $U_{in}$ that may differ from the reference voltage $U_{ref}$. For certain load cases, such input voltage $U_{in}$ resulting in a minimum power loss $P_{loss,FC+M,min}$ may be in particular lower than the reference voltage $U_{ref}$ such that it may be advantageous to operate in field-weakening mode. The voltage converter 207 is in principle more efficient when outputting higher input voltages $U_{in}$ (see FIG. 7), but the combined system of frequency converter 209, motor 203 and voltage converter 207 shows a resulting minimum power loss $P_{loss,FC+M+VC,min}$ (see FIG. 8) at an input voltage $U_{in}$ that may differ from the reference voltage $U_{ref}$. Thus, even including the power loss of the voltage converter, for certain load cases, such input voltage $U_{in}$ resulting in a minimum power loss $P_{loss,FC+M,min}$ may be in particular lower than the reference voltage $U_{ref}$ such that it may be advantageous to operate in field-weakening mode. The controller 211 may be configured to tune the input voltage $U_{in}$ so that the power loss of the combined system of frequency converter 209, motor 203 and voltage converter 207 is at its minimum $P_{loss,FC+M+VC,min}$ as shown in FIG. 8.

Figure 5:
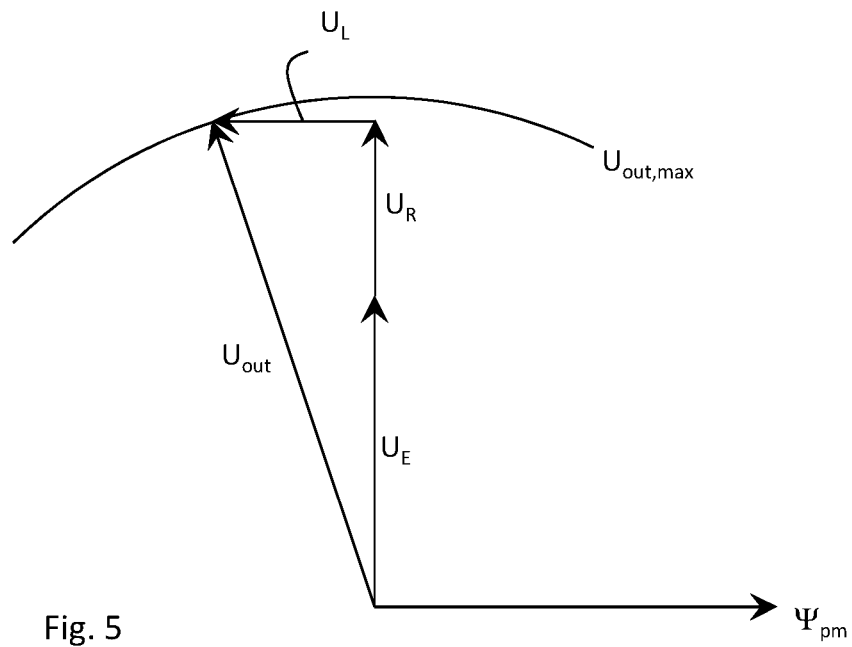
FIG. 5 is a vector diagram for operating an example of a pump assembly disclosed herein in non-field-weakening mode.

The vector diagram in a rotating reference frame of FIG. 5 illustrates the phase relation between the main components in non-field weakening mode. A magnetic flux $\Psi_{pm}$ of the permanent magnet is 90° phase-shifted with respect to a phase current I in a stator of the motor 203. An output voltage $U_{out}$ of the frequency converter 209 into the stator of the motor 203 results from a resistive voltage drop $U_R = R \cdot I$, a back EMF $U_E$ and an inductive voltage drop $U_L = \omega \cdot L \cdot I$, where an inductance L includes both a self-inductance and a phase-coupling inductance. The resistive voltage drop $U_R$ and the back EMF $U_E$ are in phase, and the inductive voltage drop $U_L$ is 90° phase-shifted with respect to the resistive voltage drop $U_R$. In the example shown in FIG. 5, the modulation index M is maximal so that the output voltage $U_{out}$ essentially equals a maximum output voltage $U_{out,max}$ illustrated by the circle. In non-field weakening mode, the drive motor 203 of the pump unit 2 disclosed herein may be operated at a maximum modulation index $M_{max}$, wherein the voltage converter 207 provides an input voltage $U_{in}$ equal to the reference voltage $U_{ref}$ to the frequency converter 209, i.e. $U_{in}=U_{ref}$.

Figure 6:
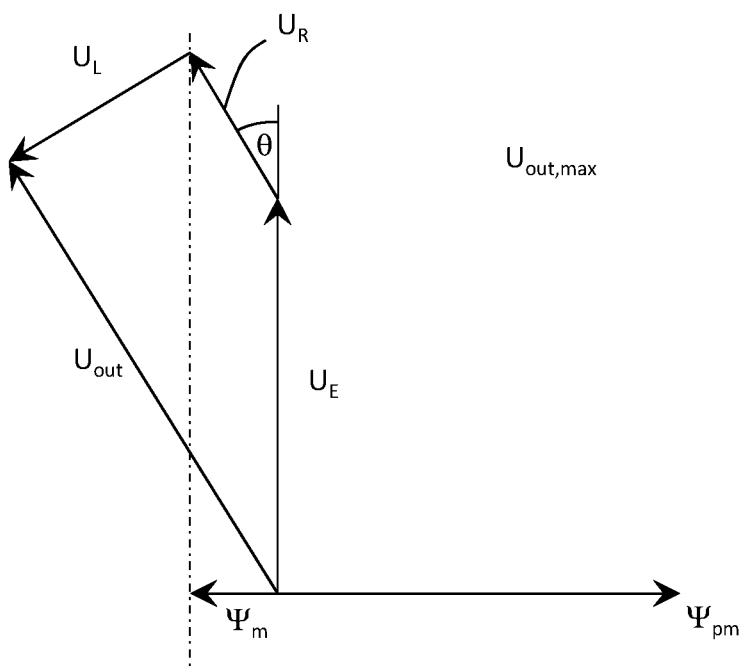
FIG. 6 is a vector diagram for operating an example of a pump assembly disclosed herein in field-weakening mode.

In order to further reduce the total power consumption, the input voltage $U_{in}$ may be decreased below the reference voltage $U_{ref}$, which is possible in field-weakening mode as shown in FIG. 6. The frequency converter 209 may shift the phase current I by an angle θ, whereby a magnetic flux $\Psi_m = I \cdot L \cdot \sin θ$ is induced by the stator windings weakening the resulting magnetic flux in the motor $\Psi = \Psi_{pm} + \Psi_m$. The reduced magnetic flux in the motor Ψ would result in less torque and hydraulic output power of the pump, which may be compensated at part load by a higher phase current I while still consuming less power in total. If the motor 203 is operated at full load where the phase current I cannot be increased any further, the field-weakening mode may be less efficient, but that may be rarely the case. Most of the time, the motor 203 may be operated at part load, when a selective operation in field-weakening mode or non-field weakening mode under appropriate tuning of the input voltage $U_{in}$ may be most efficient. Herein, full load means that the frequency converter is fed with the maximum input power, whereas part load means that the frequency converter is fed with less than the maximum input power.

Thus, field-weakening mode means that the phase current partly reduces the total magnetic flux, because it is phase-shifted with respect to the rotor magnetic flux by more than 90°. In non-field-weakening mode, the phase current has a phase-shift of 90° or less with respect to the rotor magnetic flux such that no component of the phase current reduces the total magnetic flux. In order to measure such a phase shift, position sensors may be used. As an alternative or in addition to using position sensors measuring the phase shift angle θ, the output voltage $U_{out}$ may be measured to determine whether a motor is running in field-weakening mode or non-field weakening mode. Having determined the magnetic flux Ψ, the resistance R, the inductance L, the motor speed ω and the phase current I, an output voltage $U_{out,calc}$ may be calculated as $$U_{out,calc} = \sqrt{(U_E + U_R)^2 + U_L^2} = \sqrt{(\Psi \cdot \omega + I \cdot R)^2 + (\omega \cdot L \cdot I)^2}$$

under the assumption of non-field-weakening mode, i.e. a 90° phase-shift between $U_L$ and $U_R$. If the measured output voltage $U_{out}$ is lower than the calculated output voltage $U_{out,calc}$, the motor is running in field-weakening mode. Otherwise, it is running in non-field-weakening mode.

Figure 9:
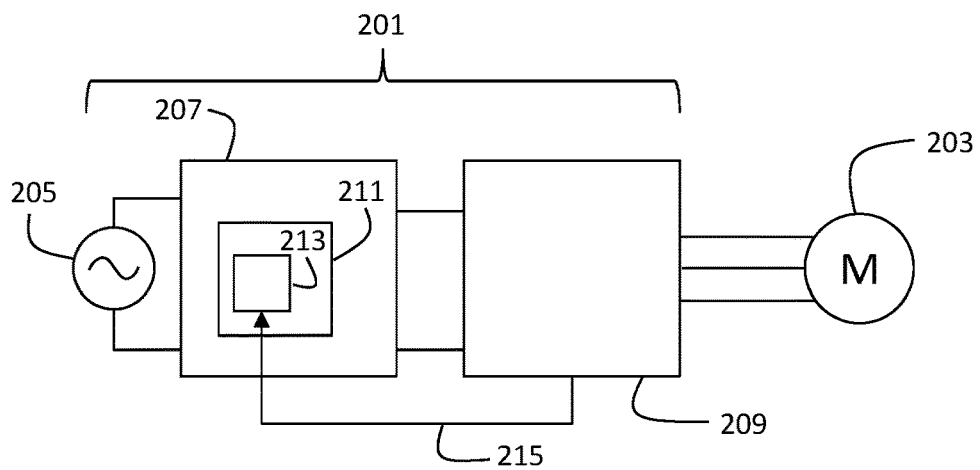
FIG. 9 is a schematic view of a control circuitry of a second example of a pump assembly according to this disclosure.
Figure 10:
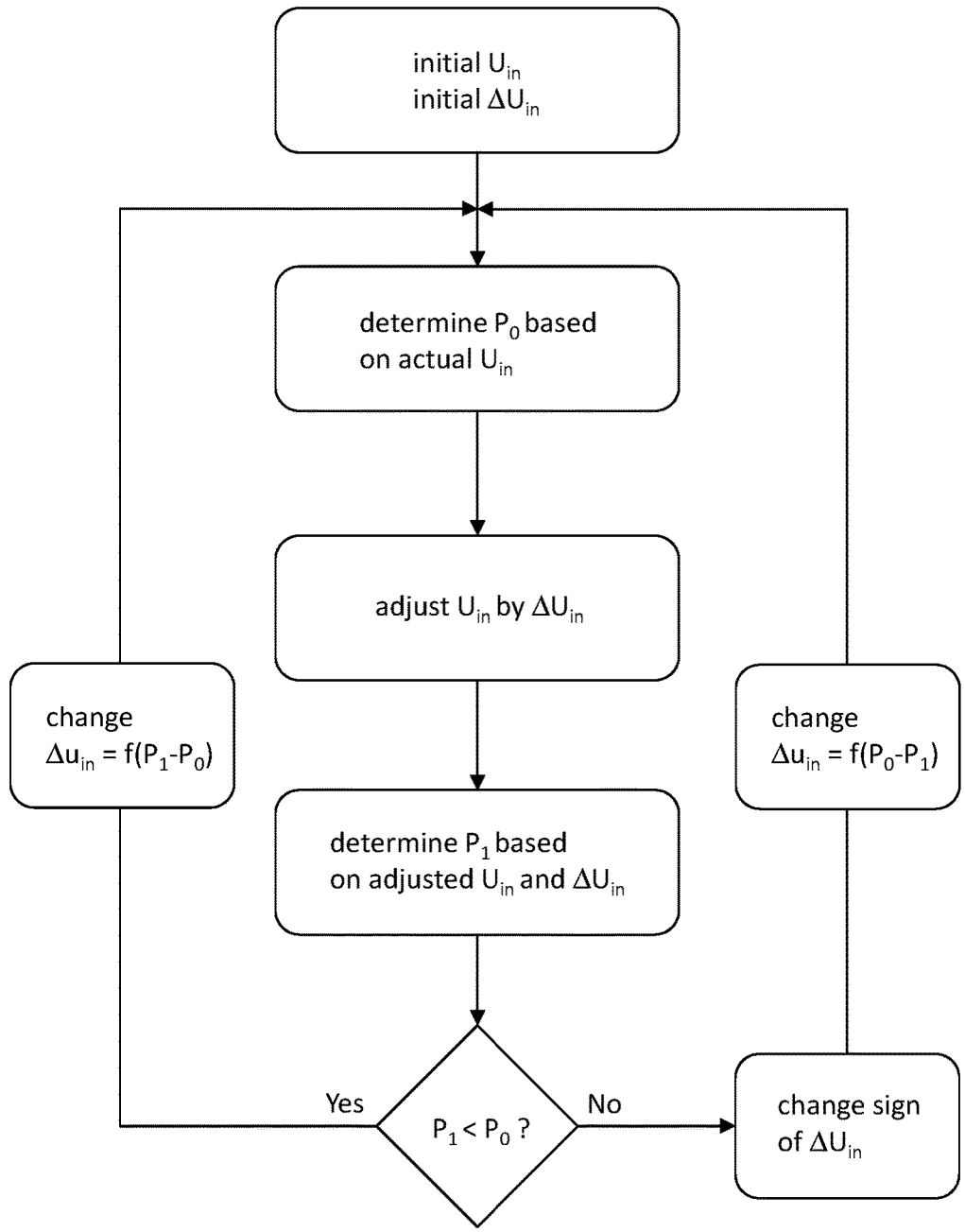
FIG. 10 is a schematic view of a minimum power loss (MPL) algorithm of an example of a pump assembly according to this disclosure.

In the embodiment of FIG. 9, the controller 211 is part of the voltage converter 207 receiving the power loss in the frequency converter 209 and in the motor 203 via a feedback loop 215. FIG. 10 further describes the minimum power loss (MPL) algorithm of the minimum power loss (MPL) module 213 of the controller 211. In a first step, an initial input voltage $U_{in}$ is provided to the frequency converter 209 by the voltage converter 207. The initial input voltage $U_{in}$ is adjustable by an initial voltage differential $\Delta U_{in}$ so that $U_{in}$ is variably adjustable within a voltage range between $U_{min}$ and $U_{max}$. In a second step, an actual power consumption $P_0$ of at least one of the drive motor 203, the frequency converter 209 and the voltage converter 207 during operation of the pump unit 2 is determined and stored. The input voltage $U_{in}$ is then varied by the initial voltage differential $\Delta U_{in}$, and an actual power consumption $P_1$ of at least one of the drive motor 203, the frequency converter 209 and the voltage converter 207 during operation of the pump unit 2 is determined. The power consumption $P_1$ and the power consumption $P_0$ are then compared. If $P_1 < P_0$ the adjustment decreased the power consumption and the above steps may be repeated starting from the adjusted input voltage $U_{in}$ until $P_1 \geq P_0$. If $P_1 \geq P_0$, the sign of $\Delta U_{in}$ may be changed to adjust $U_{in}$ in the other direction. Thereby, the input voltage $U_{in}$ is tuned depending on the determined actual power consumption during operation of the pump unit 2.

The voltage differential $\Delta U_{in}$ may not be constant, but may be a function of the power consumption differential $\Delta P$. So, the smaller the power consumption differential $\Delta P = |P_1 - P_0|$ is, the smaller the voltage differential $\Delta U_{in}$ may be chosen. The MPL algorithm may switch back to the initial voltage differential $\Delta U_{in}$ once the total minimum power loss of the combined system of frequency converter 209, motor 203 and voltage converter 207 is reached at $P_{loss,FC+M+VC,min}$.

The controller 211 may further be configured to determine a rate of change in actual power consumption in at least one of the drive motor 203, the frequency converter 209 and the voltage converter 207 during operation of the pump 1, wherein the controller 211 is configured to tune the input voltage $U_{in}$ only if the positive rate of change of the actual power consumption is below a defined threshold, i.e. the frequency converter 209 is operating in a steady power consumption within limits. If the actual power consumption is rising too quickly above limits, the MPL algorithm of FIG. 10 may be suspended until a steady power consumption within limits is reached. The controller 211 may then increase the input voltage $U_{in}$ in a pre-defined manner, e.g. at a constant rate or steps of $\Delta U_{in}$. The controller 211 may determine the actual electrical power consumption in pre-defined temporal intervals or in an essentially continuous manner to start tuning the input voltage $U_{in}$ once the power consumption is stable within limits.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

What is claimed is:

1. A pump assembly comprising:
a pump unit;
an electrical drive motor for driving the pump unit; and
a control unit for controlling the drive motor, the control unit comprising:
a frequency converter;
a voltage converter configured to provide an input voltage to the frequency converter, the input voltage being adjustable within a voltage range between a minimum input voltage and a maximum input voltage; and
a controller configured to determine an actual power consumption of at least one of the drive motor, the frequency converter and the voltage converter during operation of the pump unit and the controller is configured to tune the input voltage depending on the determined actual power consumption during operation of the pump unit.

2. The pump assembly according to claim 1, wherein the controller is configured to tune the input voltage so that the actual power consumption is minimized.

3. The pump assembly according to claim 1, wherein:
the controller is configured to determine a rate of change in actual power consumption in at least one of the drive motor, the frequency converter and the voltage converter during operation of the pump unit; and
the controller is configured to tune the input voltage only if a positive rate of change of the actual power consumption is below a defined threshold.

4. The pump assembly according to claim 3, wherein the controller is configured to increase the input voltage in a pre-defined manner if the positive rate of change of the actual power consumption is above the threshold.

5. The pump assembly according to claim 1, wherein the controller is configured to determine the actual electrical power consumption in pre-defined temporal intervals or in an essentially continuous manner to tune the input voltage accordingly.

6. The pump assembly according to claim 1, wherein:
the controller is configured to determine a power consumption differential between the power consumption when the input voltage is provided and the power consumption when another input voltage was previously provided;
tuning the input voltage includes changing the input voltage by a voltage differential; and
a sign or an amount or both a sign and an amount of the voltage differential is dependent on the determined power consumption differential.

7. The pump assembly according to claim 1, wherein:
the drive motor is operable in a field-weakening mode and a non-field-weakening mode;
the controller is configured to tune the input voltage within a voltage range between the minimum input voltage and a reference voltage in the field weakening mode; and the controller is configured to tune the input voltage within a voltage range between the reference voltage and the maximum input voltage in the non-field-weakening mode; and
the minimum input voltage is less than the reference voltage which is less than the maximum input voltage.

8. The pump assembly according to claim 1, wherein the frequency converter and the voltage converter are located on separate circuit boards and are separated by a housing wall.

9. The pump assembly according to claim 1, wherein the pump unit comprises a wet rotor circulation pump for a heating or cooling system.

10. A method for controlling an electrical drive motor for driving a pump unit, wherein a control unit of the electrical drive motor comprises a frequency converter and a voltage converter, the method comprising the steps of:
providing an input voltage to the frequency converter by the voltage converter, wherein the input voltage is adjustable within a voltage range between a minimum input voltage and a maximum input voltage;
determining an actual power consumption of at least one of the drive motor, the frequency converter and the voltage converter during operation of the pump unit; and
tuning the input voltage depending on the determined actual power consumption during operation of the pump unit.

11. The method according to claim 10, wherein tuning the input voltage includes tuning the input voltage so that the actual power consumption is minimized.

12. The method according to claim 10, further comprising determining a rate of change in actual power consumption in at least one of the drive motor, the frequency converter and the voltage converter during operation of the pump unit, wherein the step of tuning the input voltage includes is conditioned upon the positive rate of change of the actual power consumption being below a defined threshold.

13. The method according to claim 12, wherein tuning the input voltage includes increasing the input voltage in a pre-defined manner if said condition is not fulfilled.

14. The method according to claim 10, wherein determining the actual electrical power consumption includes determining the actual electrical power consumption in pre-defined temporal intervals or in an essentially continuous manner for tuning the input voltage accordingly.

15. The method according to claim 10, wherein:
tuning the input voltage includes tuning the input voltage within a voltage range between the minimum input voltage and a reference voltage when the drive motor is operated in a field-weakening mode;
tuning the input voltage includes tuning the input voltage within a voltage range between the reference voltage and the maximum input voltage when the drive motor is operated in a non-field-weakening mode; and
the minimum input voltage is less than the reference voltage which is less than the maximum input voltage.

16. The method according to claim 15, further comprising feeding back the reference voltage from the frequency converter to the voltage converter.

17. The method according to claim 10, further comprising signalling a determined total actual power consumption of a combined system of frequency converter, motor and voltage converter to the frequency converter.

18. The method according to claim 10, wherein determining the actual power consumption includes determining a total actual power consumption of a combined system of frequency converter, motor and voltage converter using an approximate power consumption in the voltage converter based on a look-up table or a determined actual power consumption in the frequency converter or the input voltage or any combination of an approximate power consumption in the voltage converter based on a look-up table, and a determined actual power consumption in the frequency converter and the input voltage.

19. The method according to claim 10, further comprising determining a power consumption differential between a power consumption when the input voltage is provided and the power consumption when another input voltage was previously provided, wherein tuning the input voltage includes changing the input voltage by a voltage differential, wherein the sign and/or the amount of the voltage differential is dependent on the determined power consumption differential.

\* \* \* \* \*